US008123991B2

(12) United States Patent
Conboy

(10) Patent No.: US 8,123,991 B2
(45) Date of Patent: Feb. 28, 2012

(54) SYSTEM AND METHOD FOR MAKING WALLBOARD

(76) Inventor: John S Conboy, Chesterfield, MO (US)

( * ) Notice: Subject to any disclaimer, the term of this patent is extended or adjusted under 35 U.S.C. 154(b) by 0 days.

(21) Appl. No.: 12/819,179

(22) Filed: Jun. 19, 2010

(65) Prior Publication Data

US 2010/0252166 A1 Oct. 7, 2010

Related U.S. Application Data

(63) Continuation-in-part of application No. 11/345,349, filed on Feb. 1, 2006, now abandoned.

(60) Provisional application No. 60/736,123, filed on Nov. 9, 2005.

(51) Int. Cl.
*B32B 38/10* (2006.01)
*B32B 13/08* (2006.01)

(52) U.S. Cl. ........ 264/109; 264/145; 425/371; 425/394; 425/510; 425/298; 83/869; 83/13; 83/42; 156/44; 156/269

(58) Field of Classification Search .................. 425/371, 425/385, 394, 520, 510, 121–123, 126.1, 425/142, 292, 298, 310, 471; 264/145, 109; 156/44, 269; 83/869, 13, 42
See application file for complete search history.

(56) References Cited

U.S. PATENT DOCUMENTS

| | | | | |
|---|---|---|---|---|
| 2,392,923 | A * | 1/1946 | Hurd | 156/44 |
| 2,818,824 | A * | 1/1958 | Read | 428/167 |
| 2,991,824 | A | 7/1961 | Loechl | |
| 3,578,517 | A | 5/1971 | Lapp et. al. | |
| 4,017,248 | A * | 4/1977 | Dieffenbacher et al. | 425/371 |
| 4,063,996 | A | 12/1977 | Adams et al. | |
| 4,450,022 | A | 5/1984 | Gatex | |
| 4,734,163 | A | 3/1988 | Eberhardt et al. | |
| 5,051,217 | A * | 9/1991 | Alpar et al. | 264/40.1 |
| 5,198,052 | A | 3/1993 | Ali | |
| 5,221,386 | A | 6/1993 | Ensminger et al. | |
| 5,453,231 | A * | 9/1995 | Douglas | 264/45.8 |
| 5,792,487 | A * | 8/1998 | Wenning et al. | 425/296 |
| 5,894,681 | A * | 4/1999 | Klockenkemper et al. | 34/524 |
| 6,110,095 | A * | 8/2000 | Finke et al. | 493/463 |
| 6,565,780 | B2 | 5/2003 | Haas | |
| 6,638,393 | B2 | 10/2003 | Lehan | |
| 7,223,311 | B2 | 5/2007 | Conboy | |
| 7,942,658 | B1 * | 5/2011 | Jensen | 425/4 R |
| 2001/0044016 | A1 | 11/2001 | Watras | |
| 2004/0065399 | A1 | 4/2004 | Conboy | |
| 2004/0089393 | A1 * | 5/2004 | Watras | 156/40 |
| 2005/0287238 | A1 * | 12/2005 | Taylor | 425/371 |
| 2006/0144497 | A1 * | 7/2006 | Capron | 156/39 |
| 2007/0069414 | A1 * | 3/2007 | Kott et al. | 264/119 |
| 2007/0295467 | A1 * | 12/2007 | Grass et al. | 162/135 |
| 2008/0254317 | A1 * | 10/2008 | Xu et al. | 428/688 |
| 2009/0211714 | A1 * | 8/2009 | Lin | 156/473 |

FOREIGN PATENT DOCUMENTS

| | | | | |
|---|---|---|---|---|
| JP | 8197348 | A1 | | 8/1996 |
| JP | 10061095 | A1 | | 3/1998 |
| JP | 2002307537 | A | | 10/2002 |
| JP | 2004009525 | A | * | 1/2004 |
| WO | WO 03/092976 | A1 | * | 11/2003 |
| WO | 2004007162 | A1 | | 1/2004 |

* cited by examiner

*Primary Examiner* — Joseph Del Sole
*Assistant Examiner* — Nahida Sultana

(57) ABSTRACT

A process and apparatus for forming wallboard panels having recessed edges along all four edges which process involves passing an unfinished length of wall board through a lateral recess forming apparatus.

30 Claims, 14 Drawing Sheets

SYSTEM AND METHOD FOR MAKING WALLBOARD

RELATED APPLICATIONS

The present application is a Continuation-in-Part of U.S. patent application Ser. No. 11/345,349 filed Feb. 1, 2006, which claims priority to U.S. Provisional Patent Application No. 60/736,123, filed Nov. 9, 2005, the contents of both of which are incorporated herein by reference.

FIELD OF THE INVENTION

This invention relates generally to gypsum board, and more specifically to a method and apparatus for providing recessed portions on the lateral edges of wallboard.

BACKGROUND OF THE INVENTION

Conventional gypsum wallboard or drywall is typically manufactured from a gypsum plaster slurry which is put between two layers of paper. More specifically, in the conventional method, a wet slurry of gypsum is poured on a conveyor between two layers of paper, and the slurry is allowed a certain amount of time to set. In gypsum wallboard, the two layers of paper contain the slurry and provide the tensile strength required in installation and use.

In at least some known fabrication methods, the conveyor is a closed loop conveyor that can travel at speeds of four hundred feet per minute or faster. The conveyor enables the wallboard to be fabricated using rolls of paper and accordingly, includes at least a longitudinal edge forming system, a cutting system, and a drying system. The edge forming system uses wedge shaped raised edges along the conveyor that create recessed areas along the longitudinal edges in the face of the wallboard prior to the wallboard being fully cured. When the wallboard is later cut to size and installed, the recesses are filled with wallboard compound, taped over, and finished to produce a smooth joint.

The cutting system enables the wallboard to be cut into predetermined discrete lengths such that substantially rectangular wallboard members are formed. The cutting system is adjustable to allow different lengths of wallboard to be cut without substantial interruption of the manufacturing operation.

After being cut, the wallboard members are moved away from the cutting station to a loading area where they are loaded into a drying system to dry the cut wallboard members.

Known wallboard includes recessed areas that extend along both of the opposed longitudinal edges of the wallboard. The recessed areas are formed by the raised edges on the conveyor. The recessed areas are in the shape of inclined planes that taper from the face of the wallboard to the longitudinal edges and have a maximum depth at the side edges of about 0.090" below the face of the wallboard.

When the wallboard is cut by the cutting system, panels of conventional wallboard are formed which are bordered by the opposed recessed longitudinal edges and by a pair of lateral non-recessed edges that connect the longitudinal edges. More specifically, the wallboard is typically cut such that the panels are fabricated with a longitudinal length that is commonly eight feet, ten feet, twelve feet, fourteen feet, and sixteen feet or longer. Additionally, wallboard panels are made in thicknesses that are commonly ¼", ⅜", ½" and ⅝" thick. For maximum efficiency and conservation of plant space, the same line must have the capability of fabricating all of the different lengths of wallboard without a major shutdown of the line.

During installation, depending on the length of the wall being formed by the wallboard, wallboard panels are typically positioned for installation such that the longitudinal edges are parallel to the floor, an installation known as a "horizontal orientation". In this installation, a longitudinal recess of a first panel is adjacent to a longitudinal recess of the adjacent panel. This forms a longitudinal recessed joint. A wallboard compound fill material and tape are then used to seal the recessed joint formed by the recessed longitudinal edges of the panels. Specifically, the recessed areas of the joints are filled with the wallboard compound, taped and smoothed across the joint, such that the joint is covered without the compound creating an unsightly bulge extending outwardly between the panels. Installing the wallboard panels such that the longitudinal length extends horizontally along a wall parallel to the floor, rather than vertically and substantially perpendicularly to the floor, facilitates faster installation time of the wallboard panels, and faster finishing time of the installed wallboard panels. In addition, when wallboard is installed in a vertical orientation, installation and labor costs may be increased as the installers and tapers must use ladders for installation and finishing.

When wallboard panels are installed on longer walls and ceilings, because the recessed areas only extend along two longitudinal edges of each panel, a butt joint may be formed between the lateral edges of two adjacent panels. Such joints must still be covered with tape and compound, but because the lateral edges do not include a recessed area, the joint compound must be spread over a wider area than those of the longitudinal joints to facilitate blending the butt joints into the wall surface without creating unsightly bulges.

Adding to the difficulty of creating recessed lateral edges in wallboard panels is the fact that the panels are made in continuous lengths, which are then cut to size after the wallboard panel has fully cured. Owing to the rigid, yet frail, nature of the gypsum, it is very difficult to create the recessed areas in the wallboard panel after the gypsum is fully cured. Efforts to do so are often met with fractured and/or crumbled gypsum and a delamination of the paper from the gypsum core in the regions subjected to the recess formation.

SUMMARY OF THE INVENTION

The present invention comprises a method of making wallboard having recesses along all four edges thereof, the method comprising the steps of a) providing an unfinished length of wallboard that has a recess along its longitudinal edges and b) forming recesses along each lateral edge by conveying the unfinished length of wallboard, longitudinal edge first, through a recess forming apparatus having a plurality of presses aligned with or parallel to the lateral edges of the wallboard, each press having an upper and a lower press assembly, a fore and an aft end, and opposing surfaces on said upper and lower assemblies defining a gap through which the wallboard passes in a planar orientation and in a direction perpendicular to the longitudinal edges, which gap gradually tapers from the fore end, which first receives the wallboard, to the aft end so as to cause a gradual compression of the wallboard along the lateral edges: thereby forming the lateral recesses.

In accordance with a second embodiment of the present invention, there is provided a method of forming wallboard having recesses along each of its edges, said method comprising a) forming a continuous length of wallboard with a longitudinal recess along each of its longitudinal edges, b) cutting an unfinished length of partially cured wallboard from the continuous length of wallboard, c) forming a plurality of lateral recesses in the portion of unfinished wallboard, one lateral recess at each lateral edge thereof and at least one lateral recess parallel to and offset from the lateral edges, and d) cutting the unfinished length of wallboard at and along the at least one offset lateral recess to form a plurality of finished lengths of wallboard. Preferably the lateral recesses are formed by conveying the wallboard through a recess forming apparatus having a plurality of presses, one press aligned with or parallel to each of the lateral edges of the wallboard and at least one additional press positioned along the longitudinal edge of the wallboard offset from the lateral edges and at the point(s) corresponding to the desired final length(s) of the finished wallboard and aligned perpendicular to the longitudinal edge, each press having an upper and a lower press assembly, a fore and an aft end, and opposing surfaces on said upper and lower assemblies defining a gap through which the wallboard passes in a planar orientation and in a direction perpendicular to the longitudinal edges, which gap gradually tapers from the fore end, which first receives the wallboard, to the aft end so as to cause a gradual compression of the wallboard along the lateral edges as well as across the width of the wallboard at the point(s) of the offset presses. Accordingly, this method further comprising the selection of the number and positioning of the offset presses to correspond to the desired lengths of the finished wallboard to be produced. This method provides custom lengths of finished wallboard having recessed lateral and longitudinal edges.

The present invention also provides for a device for forming the recesses in an unfinished length of wallboard. The device comprises a plurality of presses in spaced, parallel relationship, each press having a fore and an aft end and comprising upper and lower press assemblies having opposing surfaces defining a gap through which a length of wallboard is to pass, said gap gradually tapering from the fore end to the aft end of the press assemblies, the degree of the taper generally coinciding with the depth of the recess to be formed, wherein, in use, a number of presses corresponding to the number of lateral recesses to be formed are positioned such that their fore ends will engage the leading longitudinal edge of the unfinished length of wallboard as the wallboard enters the gap and the taper of the gap will cause a gradual compression of the wallboard as the wallboard passes through the gap, exiting the aft end of the gap. Most preferably, the device comprises at least three presses: a first press positioned so as to be located at and parallel to a first lateral edge of the unfinished length of wallboard, a second press positioned so as to be located at the second lateral edge of the unfinished length of wallboard opposite the first lateral edge, and a third press positioned so as to be located between the first and second presses at a point corresponding to the desired length(s) of wallboard to be produced. As unfinished lengths of wallboard are fed into the first, second and third presses, the first press forms a recess along the first lateral edge, the second press forms a recess along the second lateral edge and the third press forms a recess in the wallboard generally parallel to the first recess and between the first and second lateral edges.

DESCRIPTION OF THE PREFERRED EMBODIMENT

Figure 1:
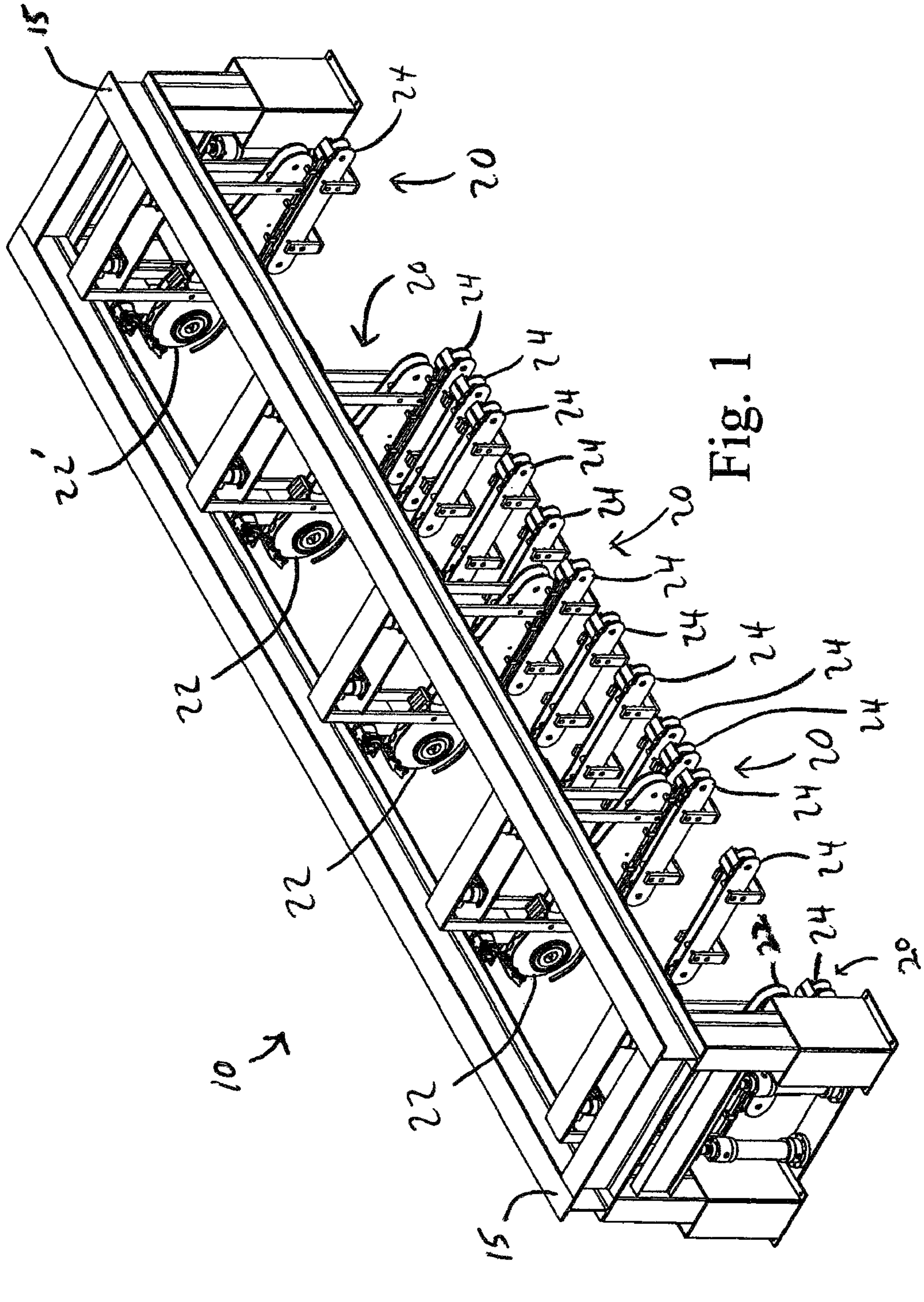
FIG. 1 is plan view of a recess forming device having a plurality of drywall presses according to an embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a preferred embodiment of the present invention comprises a recess forming apparatus 10 having one or more presses 20 for forming one or more recesses in a finished or an unfinished length of partially cured gypsum wallboard. Most preferably, the recess forming apparatus comprises a support structure 15 having at least two presses for forming recesses along each lateral edge of a length of partially cured wallboard, particularly wallboard having preformed longitudinal recesses, such that the finished lengths have recessed edges on all four edges of the wallboard. For the purposes of the present invention, a recess can be a tapered or non-tapered recess. The invention preferably performs this press function in partially cured gypsum wallboard panels after the gypsum slurry has been applied to the paper backing and allowed to at least partially set but before the wallboard is sent to ovens to fully cure. However, it is also within the scope of the present invention to form recesses in cured gypsum before it is cut into finished lengths or to sheets of cured gypsum wallboard that has already been cut to finished lengths.

In a more preferred aspect, the recess forming apparatus 10 has at least three presses such that where the gypsum is only partially cured and the wallboard not cut to finished lengths, the recessed areas are formed along the lateral edges of the uncut wallboard and also in one or more, preferably several, locations along the length of the uncut wallboard. The locations of the recesses on the length of the uncut wallboard will vary depending upon whether eight foot lengths, nine foot lengths, ten foot lengths, etc. of wallboard, or combinations of length thereof, are being produced. Specifically, a press is positioned at each lateral edge of the unfinished wallboard as well as at each point along the longitudinal edge of the wallboard corresponding to the desired length(s) of wallboard to be cut from the unfinished length of wallboard.

Typically, the length of uncut and partially cured wallboard that is sent to ovens to be fully cured is 32', although other lengths may be produced in various gypsum wallboard plants. The 32' foot length, or other appropriate length, is referred to as the unfinished length. In the event of 32' lengths, it is preferred to have a recess forming apparatus with presses located at 0' (i.e. the lateral edge), 8', 9' 10', 12', 14', 16', 18', 20', 22', 23', 24', 27' and 32' (i.e. the opposite lateral edge). According to one embodiment, this may be accomplished by providing dedicated presses at each location indicated. Alternatively, a smaller number of presses may be used provided that at least some of the presses are moveable along and positionable on the support structure at the various required locations. By feeding the 32' length of unfinished wallboard into the recess forming apparatus and forming recesses along the lateral ends thereof and at one or more locations along the length of the wallboard corresponding to the desired or conventional length(s) of the final wallboard panels to be produced, each recess running the width of the wallboard, every common length of wallboard can be manufactured with lateral edge tapers at the finished wallboard lengths.

The presses 20 each comprise an upper press assembly 22 and a lower press assembly 24. In operation, the wallboard 26 passes between the upper and lower press assemblies 22 and 24. The upper press assemblies 22 are moveable from an upper position where the upper-press assemblies 22 do not contact the uncut wallboard in the recess forming apparatus and a lower position where the upper press assemblies 22 come into contact with the uncut wallboard. Because the recesses are most preferably only about 0.090" deep, the upper press assemblies 22 are infinitely adjustable in the vertical direction such that fine adjustment can be made to adjust for tolerances in the thickness of the wallboard and also to accommodate wallboard of different nominal thicknesses. The proper adjustment of the height of the upper press assembly may be detected by either a laser measure or by physically contacting the wallboard, for example with a roller that measures the precise thickness of the wallboard. The upper presses 22 are all individually adjustable to properly control recess depth as the wallboard moves through the presses.

In the embodiment shown in FIG. 1, four upper press assemblies 22 have been lowered in position at 0', 12', 22' and 32' to make wallboard of 10' and 12' lengths: two of the former and one of the latter from each 32' length of unfinished wallboard. FIG. 1 also shows a fifth upper press assembly 22' on the support structure; however, this fifth upper press assembly is not participating in the recess forming process with this particular apparatus set up. FIG. 1 also shows a plurality of extra lower press assemblies 24 which help convey the wallboard through the recess forming apparatus while concurrently providing additional support to the wallboard panel as it moves through the recess forming apparatus. The additional lower press assemblies may be fixed or moveable, independent of the upper press assemblies. In this regard, the lower press assemblies, or some number of them, may be prepositioned to correspond to the possible lengths of wallboard desired such that only the upper press assemblies need be moved to change the position(s) of the recesses to be formed in the unfinished length of wallboard and, hence, the lengths of finished wallboard panels to be formed.

Figure 2:
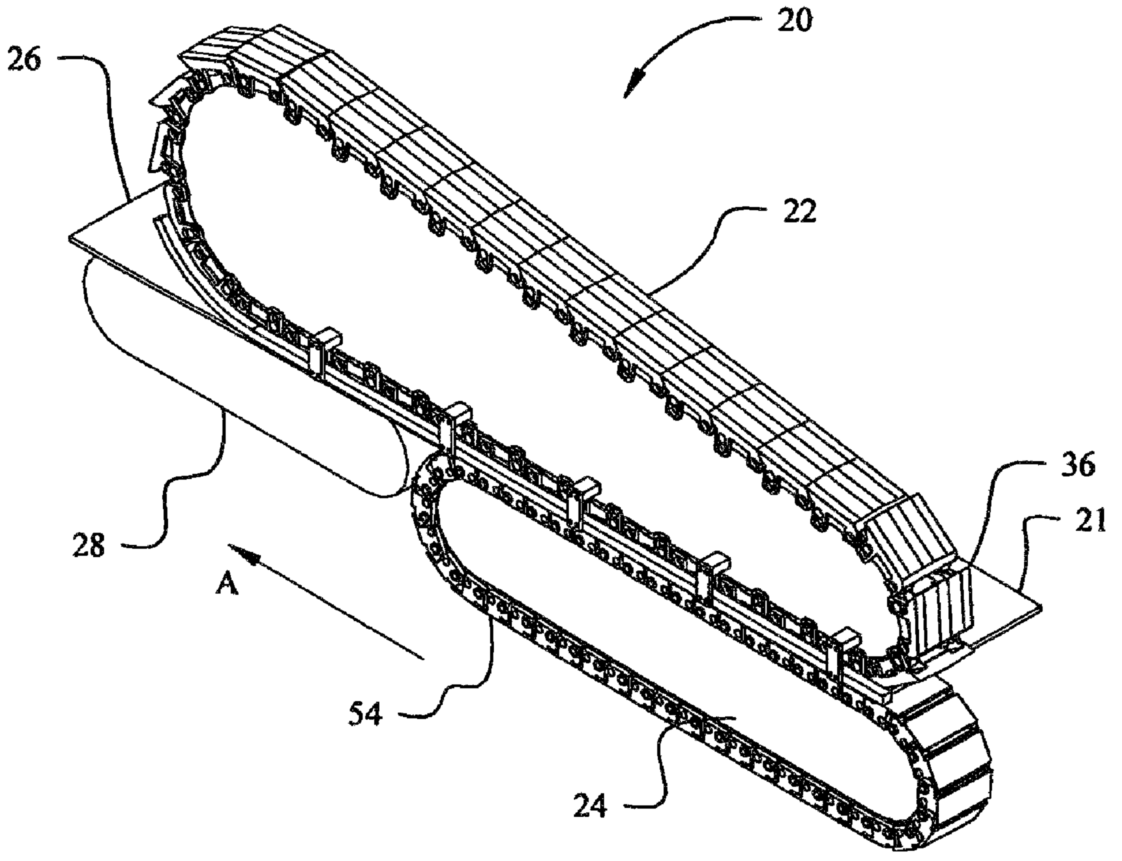
FIG. 2 is perspective view of a drywall press according to an embodiment of the present invention.

FIG. 2 shows the upper press assembly 22, the lower press assembly 24 and a takeout conveyor 28 to remove the wallboard from the press. An upper surface of the takeout conveyor 28 is preferably in a plane lower than the upper surface of the lower press assembly 24 so that the wallboard 26 will move away from the upper press assembly 22 as it exits the lower press assembly 24. Lengths of wallboard 26 are shown between the upper and lower press assemblies 22 and 24, and the press assemblies 22 and 24 and takeout conveyor 28 move the wallboard in a direction indicated by arrow A.

Figure 3:
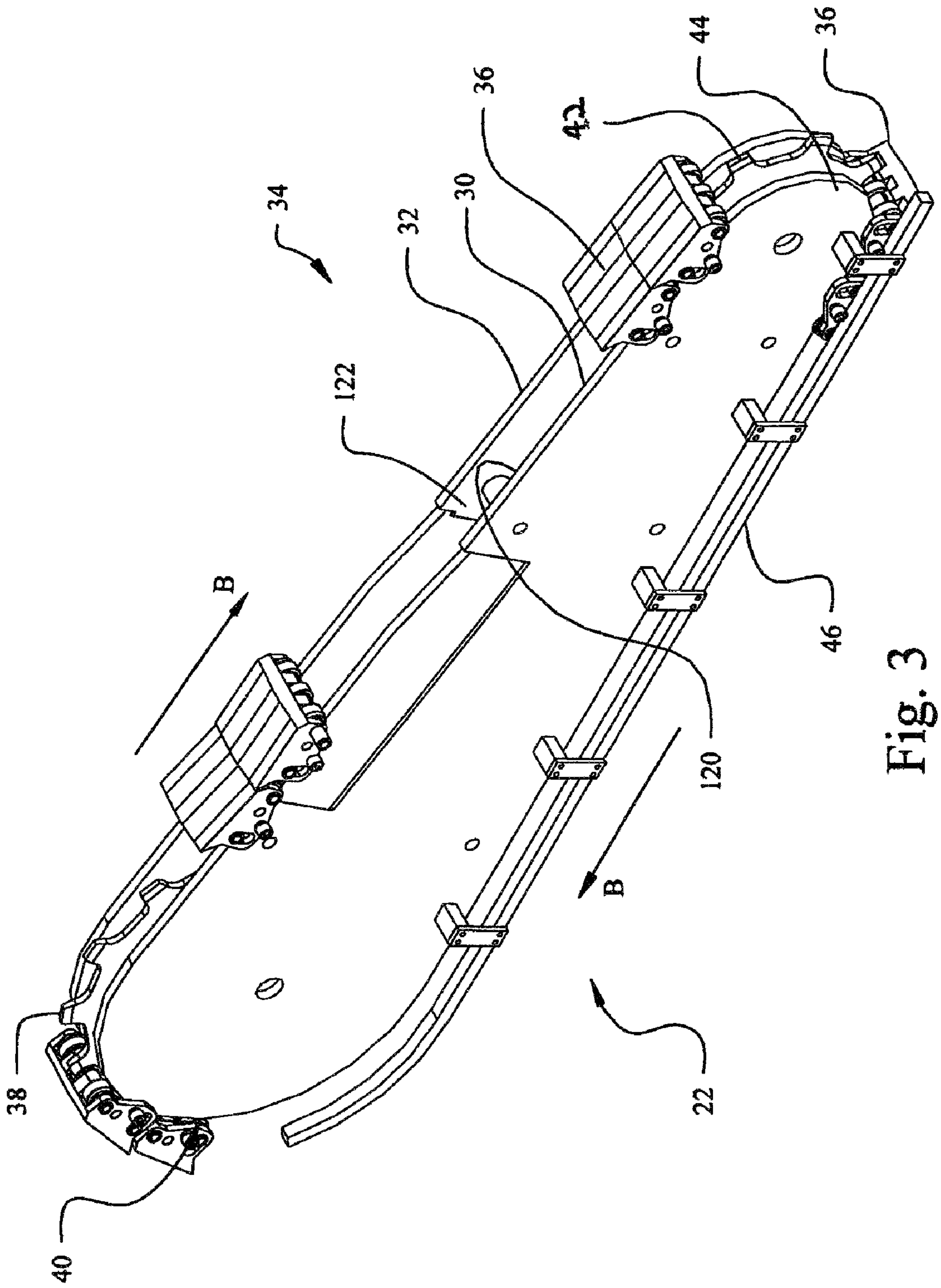
FIG. 3 is perspective view of an upper press assembly according to an embodiment of the present invention with most of the upper shoe assemblies removed.

As shown in FIG. 3, the upper press assembly 22 comprises two spaced apart plates 30 and 32 attached to one another to form an upper plate assembly 34. Riding upon the upper plate assembly 34 are a plurality of upper shoe assemblies 36. The upper shoe assemblies 36 are attached to one another end-to-end and form a loop around the upper plate assembly 34, much like the track of a tractor. A large sprocket 38 is located at a first end 40 of the upper plate assembly 34, and a small sprocket 42 is located at an opposite, second end 44 of the upper plate assembly 34. The sprockets are located between the plates 30 and 32. One or both of the sprockets 38 and 42 are powered to cause the upper shoe assemblies 36 to rotate about the upper plate assembly 34 in the direction shown by the arrows B. Also provided is a shoe support bar 46 that maintains the upper shoe assemblies 36 adjacent the upper plate assembly 34 as the upper shoe assemblies 36 travel along the bottom portion of the upper plate assembly 34 until the upper shoe assemblies 36 are out of contact with the wallboard as they extend around the large sprocket 38, as further described below.

Figure 4:
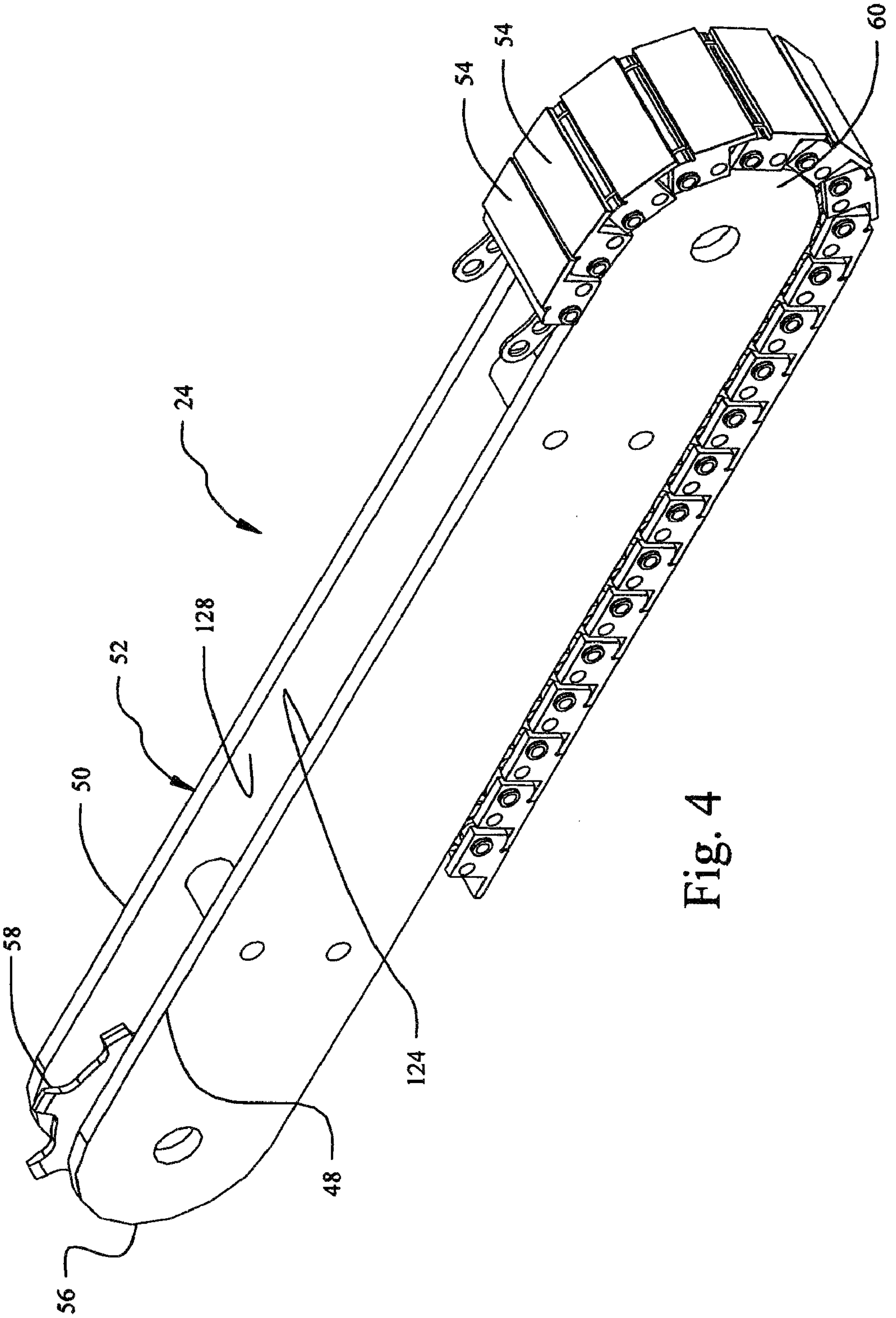
FIG. 4 is perspective view of a lower press assembly according to an embodiment of the present invention with most of the lower shoe assemblies removed.

The lower press assembly 24 is shown in FIG. 4 and comprises first and second plates 48 and 50 attached to one another and spaced apart from one another to form a lower plate assembly 52 having a first end 56 and a second end 60. Mounted upon the lower plate assembly 52 are a plurality of lower shoe assemblies 54. The lower shoe assemblies 54 extend around the lower plate assembly 52 to form a loop. The lower shoe assemblies 54 are further driven by one or both of a first sprocket 58 at the first end 56 and a second sprocket (not shown) at a second end 60.

Referring to FIGS. 3, 5 and 6A-6F, the upper shoe assemblies 36 of the upper press assembly 22 comprise a forming plate 64. The forming plate 64 comprises two upstanding outer walls 66 and 67. Between the walls 66 and 67 are located two support blocks 68. Each support block 68 defines a bore 70 that is in line with bores 72 defined in each outer wall 66 and 67. The support blocks 68 each further define an arcuate stop portion 74. Mounted within the bores 70 and 72 is a pin 76. The pin 76 captures three roller bearings 78 as well as two chain side plates 80. Another pin 82 captures three more roller bearings 84 and an opposite end of the chain side plate 80. The pin 82 is associated with the upper shoe assembly 36 by virtue of the pin 82 extending into two slots 84' that are formed within the side walls 66 and 67 of the forming plate 64. The roller bearings 84 are spaced apart by collars 75 placed over the pin 82 and between the bearings 84.

Figure 5:
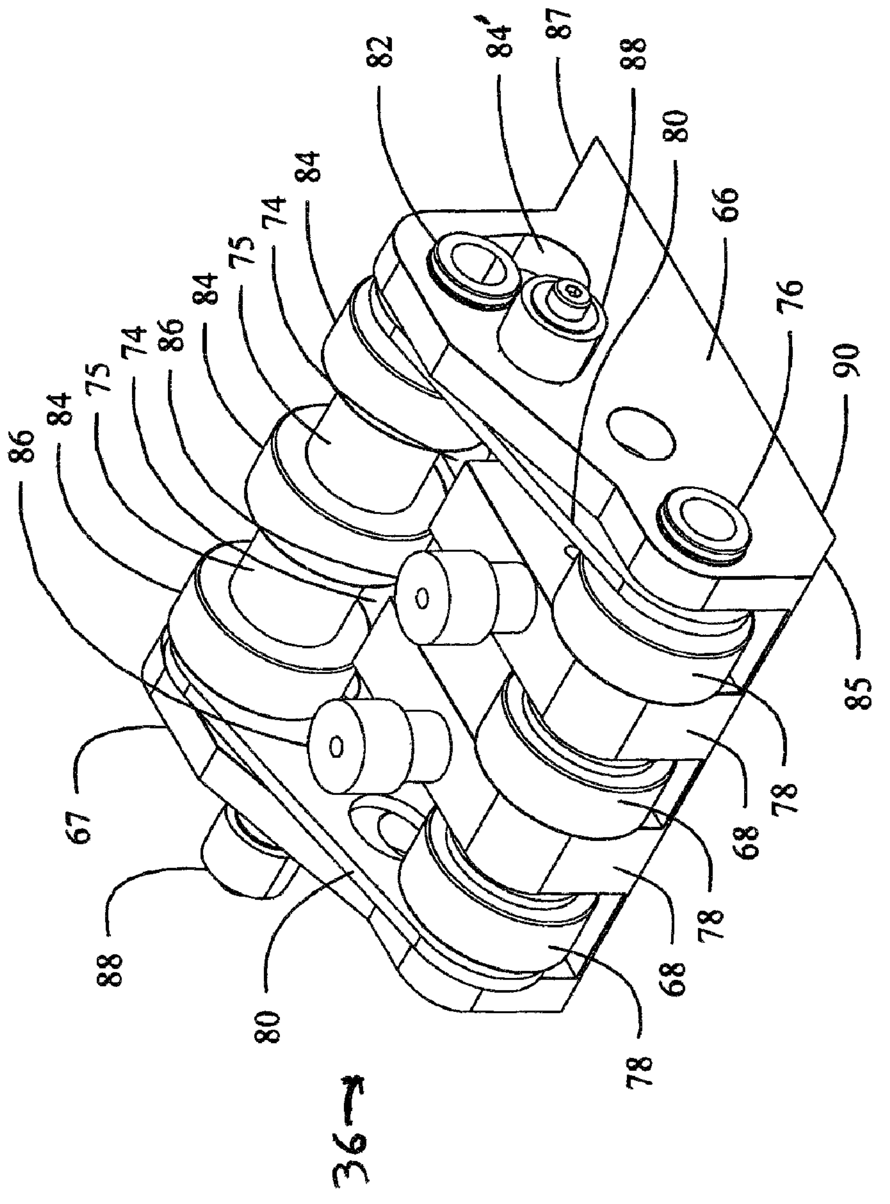
FIG. 5 is perspective view of an upper shoe assembly according to an embodiment of the present invention in an extended position.
Figure 7:
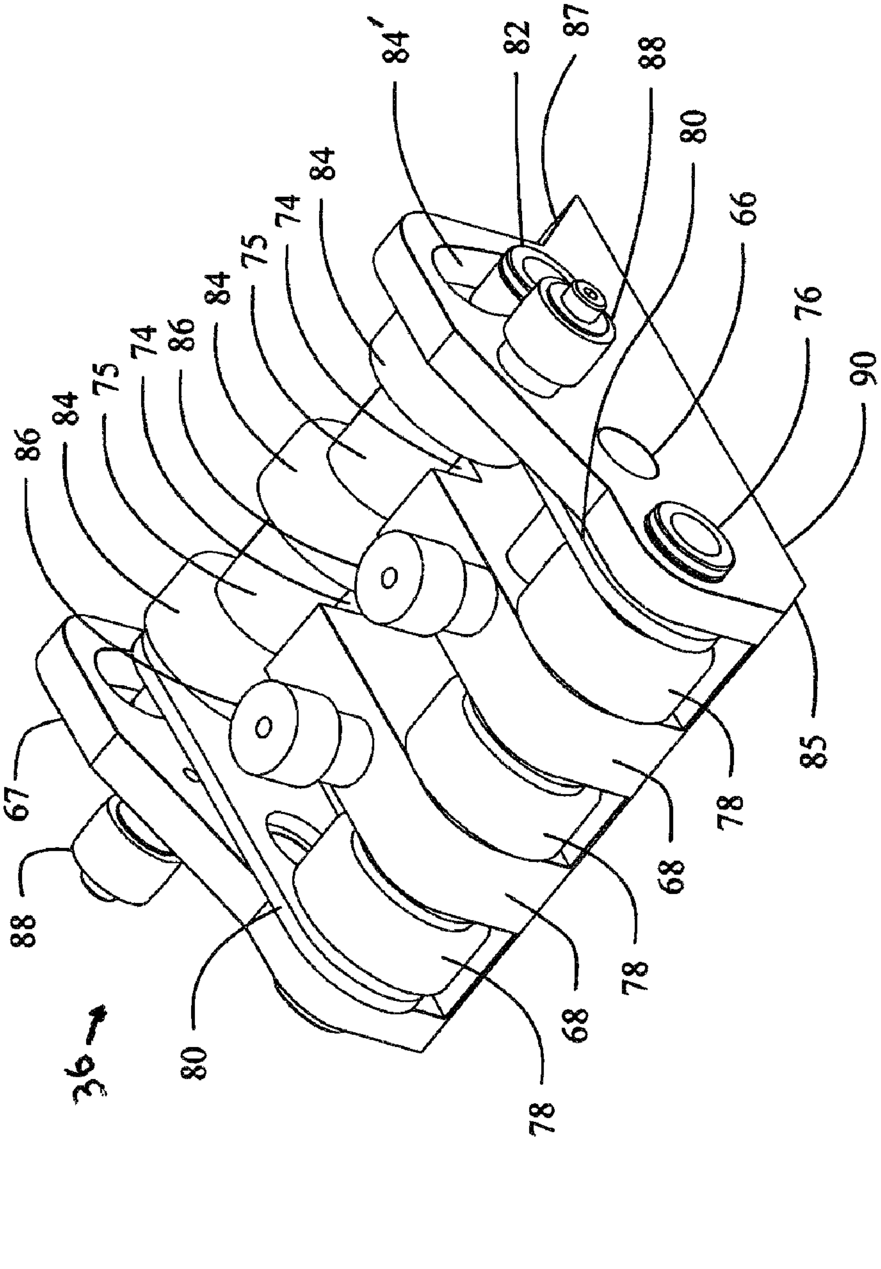
FIG. 7 is perspective view of an upper shoe assembly according to an embodiment of the present invention in a retracted position.

As a result of pin 82 being located within the slots 84', the forming plate 64 is allowed to pivotally move about the pin 76 from a first, open position as shown in FIG. 5 to a second, closed position as shown in FIG. 7, making the distance between the roller bearings 84 and a bottom surface 90 of the forming plate 64 variable.

The upper shoe assembly 36 further comprises a pair of shoe alignment bearings 86 mounted on the support blocks 68. Additionally, shoe pivot bearings 88 are attached to each wall 66 and 67.

Figure 6A:
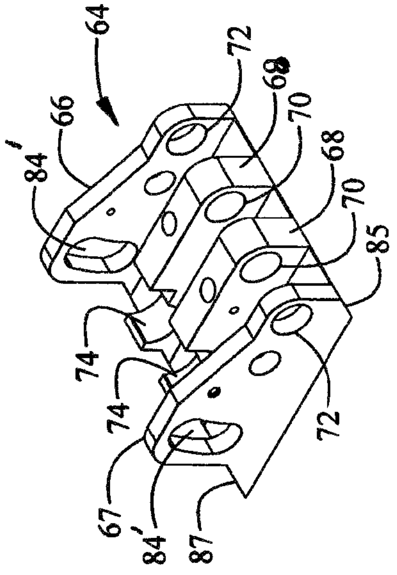
FIGS. 6A-6F are different views of an upper shoe according to an embodiment of the present invention.
Figure 6B:
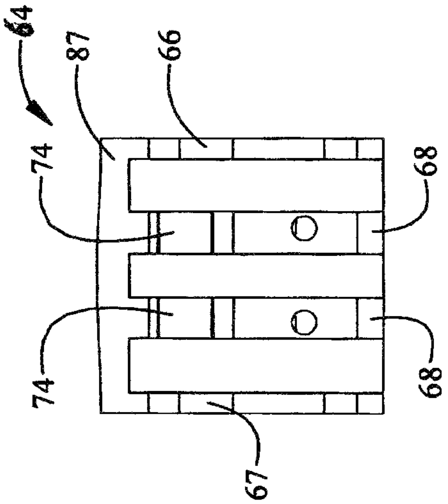
Figure 6C:
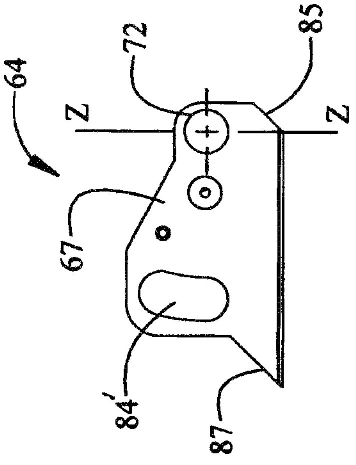
Figure 6D:
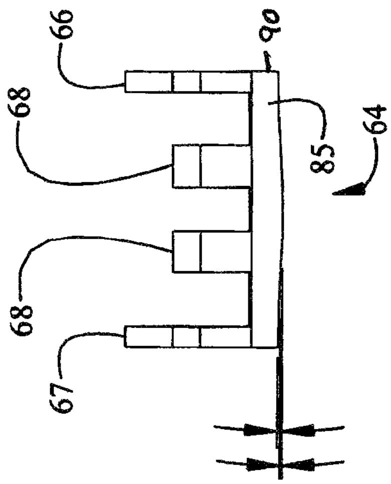
Figure 6E:
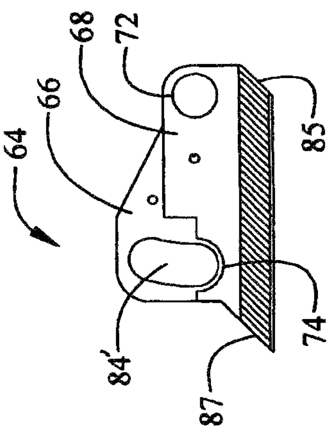
Figure 6F:
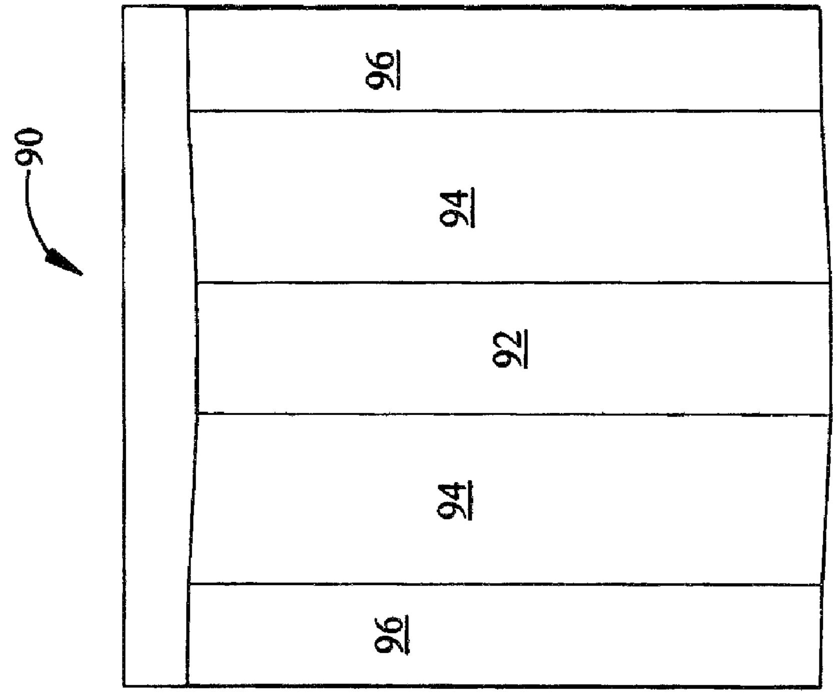

In the most preferred embodiment, the bottom surface 90 of the forming plate 64 is 6½" wide as viewed from FIG. 6D and FIG. 6F. A flat pad 92 is centered on the bottom surface 90 of the forming plate 64 is approximately 1¼" wide. First tapered portions 94 taper at about a three degree angle from the flat pad 92 for about 1¼" from the center of the bottom surface 90. Second tapered portions 96 taper at about a one degree angle from the flat pad 92 from the first tapered portion 94 to either edge of the forming plate 64. The multiple tapered surfaces prevent bulging of the wallboard it the edge of the forming plate 64.

Multiple upper shoe assemblies 36 are attached to one another through the use of additional chain side plates 80 which extend from the pin 82 to a pin 76 of an adjacent, trailing upper shoe assembly 36 and a chain side plate 80 that extends from a pin 76 of the upper shoe assembly 36 to the pin 82 of an adjacent, preceding upper shoe assembly 36. The forming plates 64 further comprise a front support surface 85 and a rear support surface 87. The point where the front support surface 85 meets the bottom surface 90 is located at or behind an imaginary line Z-Z (FIG. 6C) which passes though the center of the aligned bores 70 and 72 and perpendicular to the surface 90. When the upper shoe assemblies 36 are attached to one another with the chain side plates 80, the front support surface 85 of one upper shoe assembly 36 rests upon the rear support surface 87 of an adjacent upper shoe assembly 36. In this manner the bottom surfaces 90 of each shoe provide a consistent surface in which the flat pads 92, first tapered portions 94 and second tapered portions 96 of the attached upper shoe assemblies 36 align and are coplanar to form a consistent surface even with significant force applied to the surface 90 of each forming plate 64.

Referring to FIGS. 4, 8A-D and 9, the lower shoe assemblies 54 comprise a support plate 98. The support plate 98 has a flat lower surface 100 and two upwardly extending sidewalls 102 and 103. The support plate 98 also comprises a pair of support blocks 104 each having aligned bores 106 defined therein which align with bores 108 defined within the sidewalls 102 and 103. Inserted within the aligned bores 106 and 108 is a pin 110. The pin 110 retains three roller bearings 120 and two chain side plates 80 to the support plate 98. Also attached to the two support blocks 104 are alignment bearings 115. The chain side plates 80 each attach to a pin 110 of a preceding, adjacent support plate 98 and the chain side plates 80 of a following, adjacent support plate 98 attach to the pin 110 of the present support plate 98, and so on, to create a chain.

The forming plate 98 further defines an arcuate surface 116 and a rear support shelf 118. When multiple lower shoe assemblies 54 are attached to one another by the chain side plates 80 the arcuate surface 116 of a lower shoe assembly 54 rests upon the rear support shelf 118 of an adjacent lower shoe assembly 54. As a result, lower surfaces 100 of the lower shoe assemblies 54 form a flat surface upon which a sheet of partially cured wallboard 26 may rest without deformation of the wallboard 26.

Figure 10B:
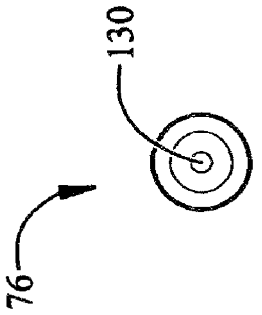
FIGS. 10A-10C are different views of a pin according to an embodiment of the present invention.
Figure 10C:
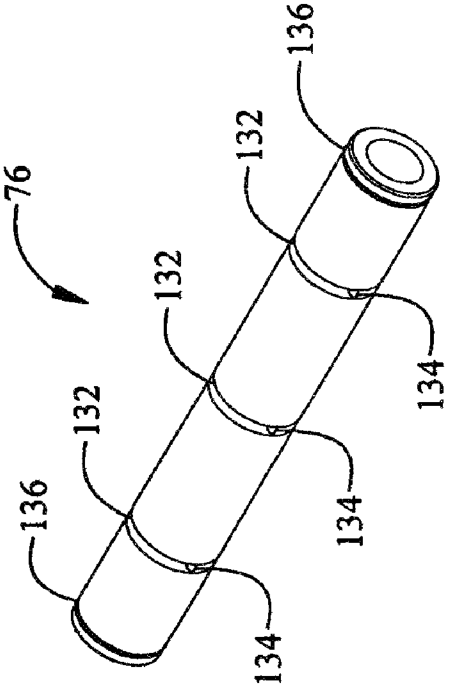
Figure 10A:
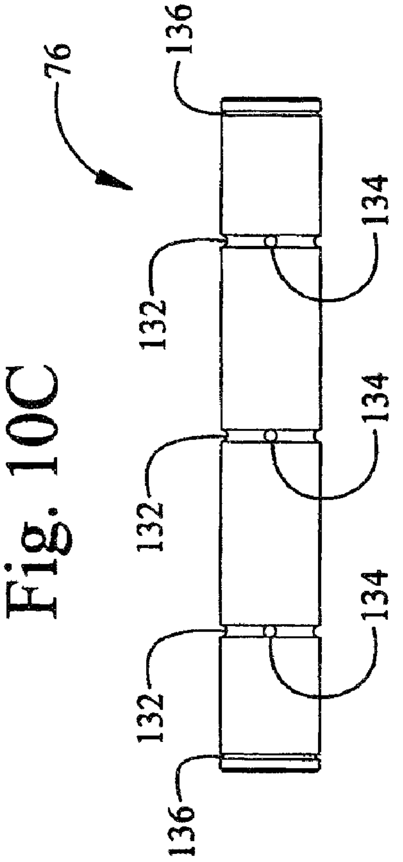

Referring to FIGS. 10A-C, the pins 76, 82 and 110 are preferably identical and are described with respect to representative pin 76. The pin 76 has central bore 130 that is threaded at either end. The pin 76 further has annular grooves 132 at the locations that correspond to the mounting of bearings thereon. Connecting bores 134 extend through the pin 76 at the location of the annular grooves 132 to provide a path from the annular grooves 132 to the central bore 130. In this manner, grease fittings may be threaded into the pin 76 at the central bore 130 to provide grease through the central bore 130 to the connecting bores 134 to the annular grooves 132 and to lubricate the bearings mounted on the pin 76. Annular grooves 136 are sized to accept retainer clips to retain the pins 76 in the forming plate 64 or support plate 98, as the case may be.

The upper shoe assemblies 36 of the upper press assembly 22 are maintained and aligned on the plates 30 and 32 by the shoe alignment bearings 86. The shoe alignment bearings 86 contact inner surfaces 120 and 122 of the plates 30 and 32, respectively, of the upper press assembly 22. Likewise, the lower shoe assemblies 54 of the lower press assembly 24 are maintained and aligned on the plates 48 and 50 by the alignment bearings 115. The alignment bearings 115 contact inner surfaces 124 and 128 of the plates 48 and 50 of the lower press assembly 24.

Figure 12:
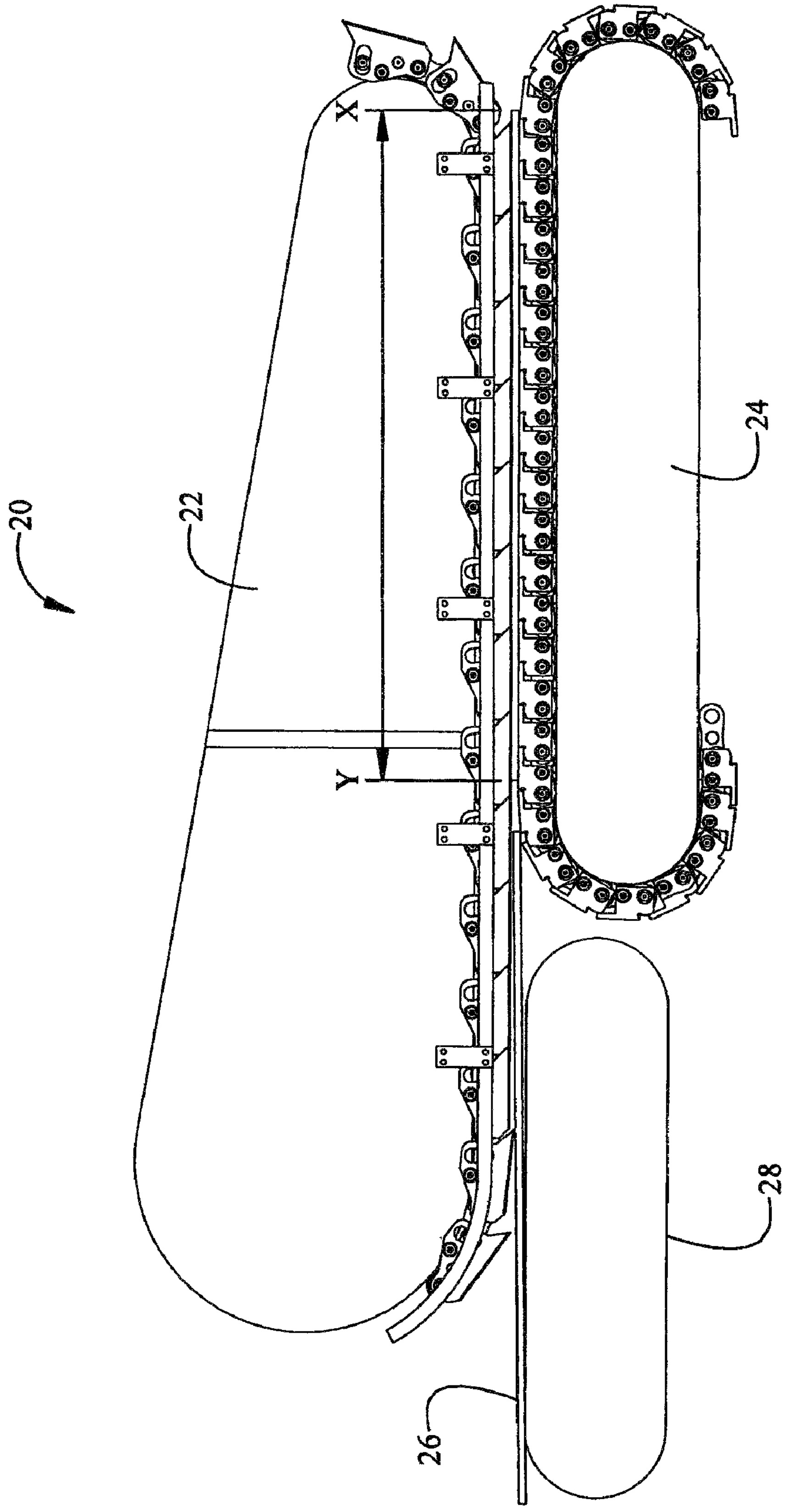
FIG. 12 is an elevation view of a length of wallboard passing through an upper and lower press assembly according to an embodiment of the present invention.

FIG. 12 shows a simplified view of the interaction of the upper shoe assemblies 36 and the lower shoe assemblies 54 as they are moved about the perimeter of the plates 30 and 32 and the plates 48 and 50, respectively. The upper shoe assemblies 36, as they pass the around the second end 44 of the upper press assembly 22, pivot outwardly. In this manner, the surfaces 90 of the upper shoe assemblies 36 become parallel to the wallboard 26 at the point where the surfaces 90 first make contact with the wallboard. The upper shoe assemblies 36 initially make contact with the wallboard 26 and compress it an initial 0.010". In this manner, the upper shoe assemblies 36 do not dig into or put divots in the wallboard 26 with a leading edge of the upper shoe assembly 36.

Figure 8A:
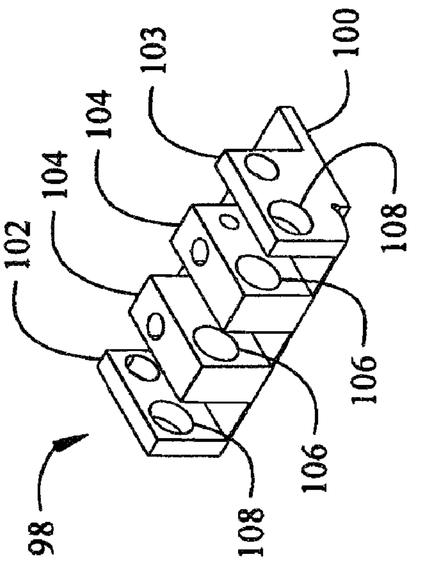
FIGS. 8A-8D are different views of a lower shoe according to an embodiment of the present invention.
Figure 8B:
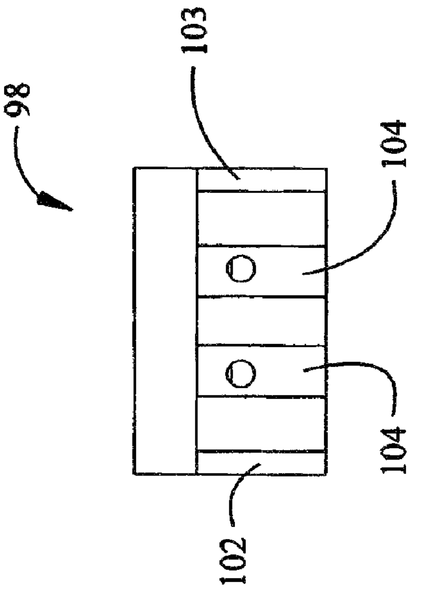
Figure 8C:
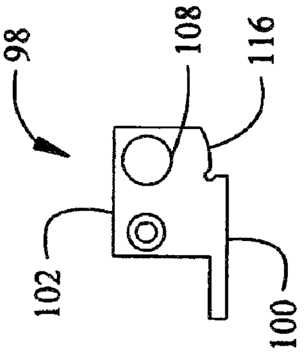
Figure 8D:
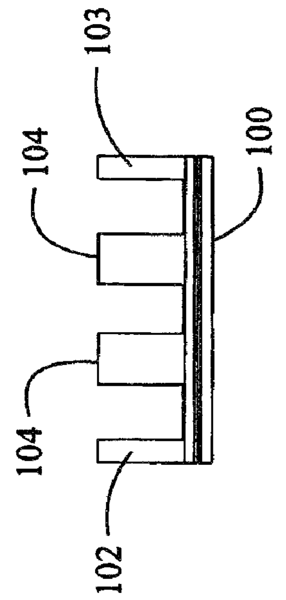
Figure 9:
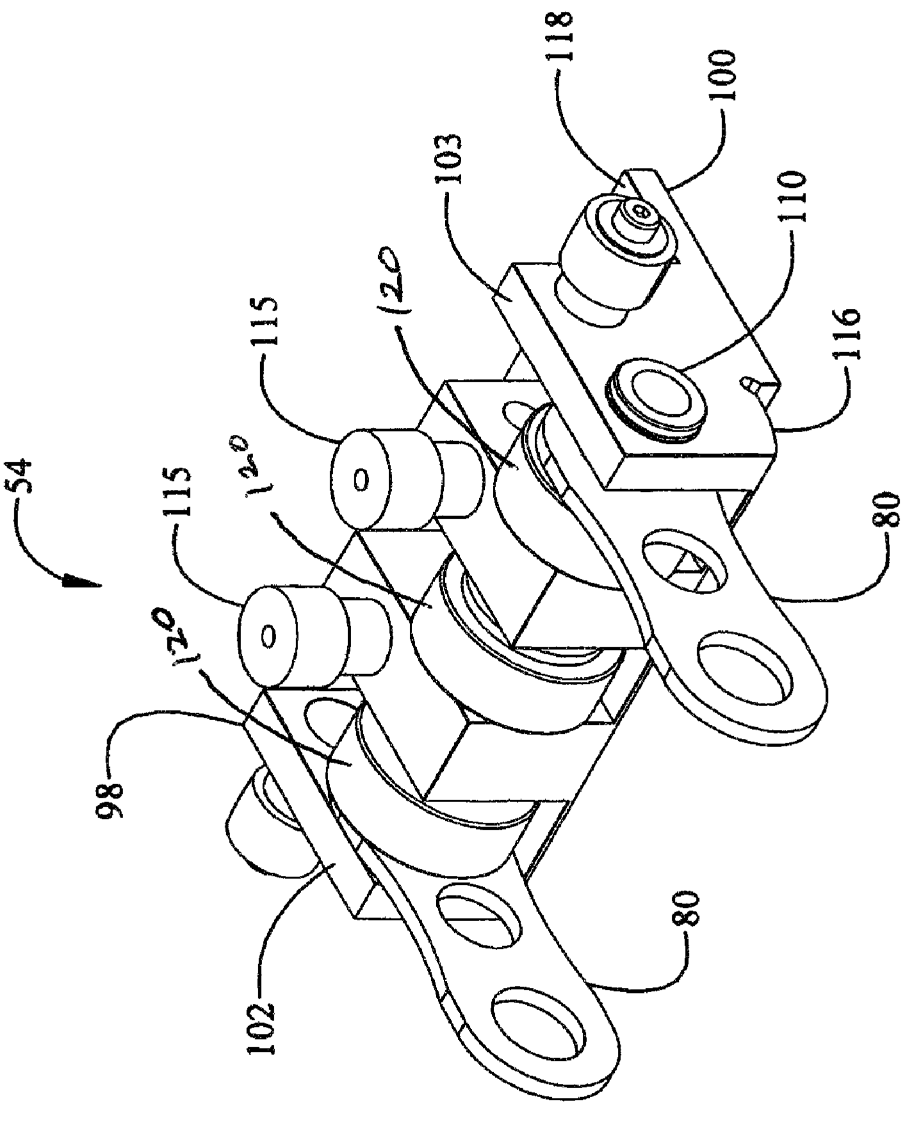
FIG. 9 is perspective view of a lower shoe assembly according to an embodiment of the present invention.
Figure 11:
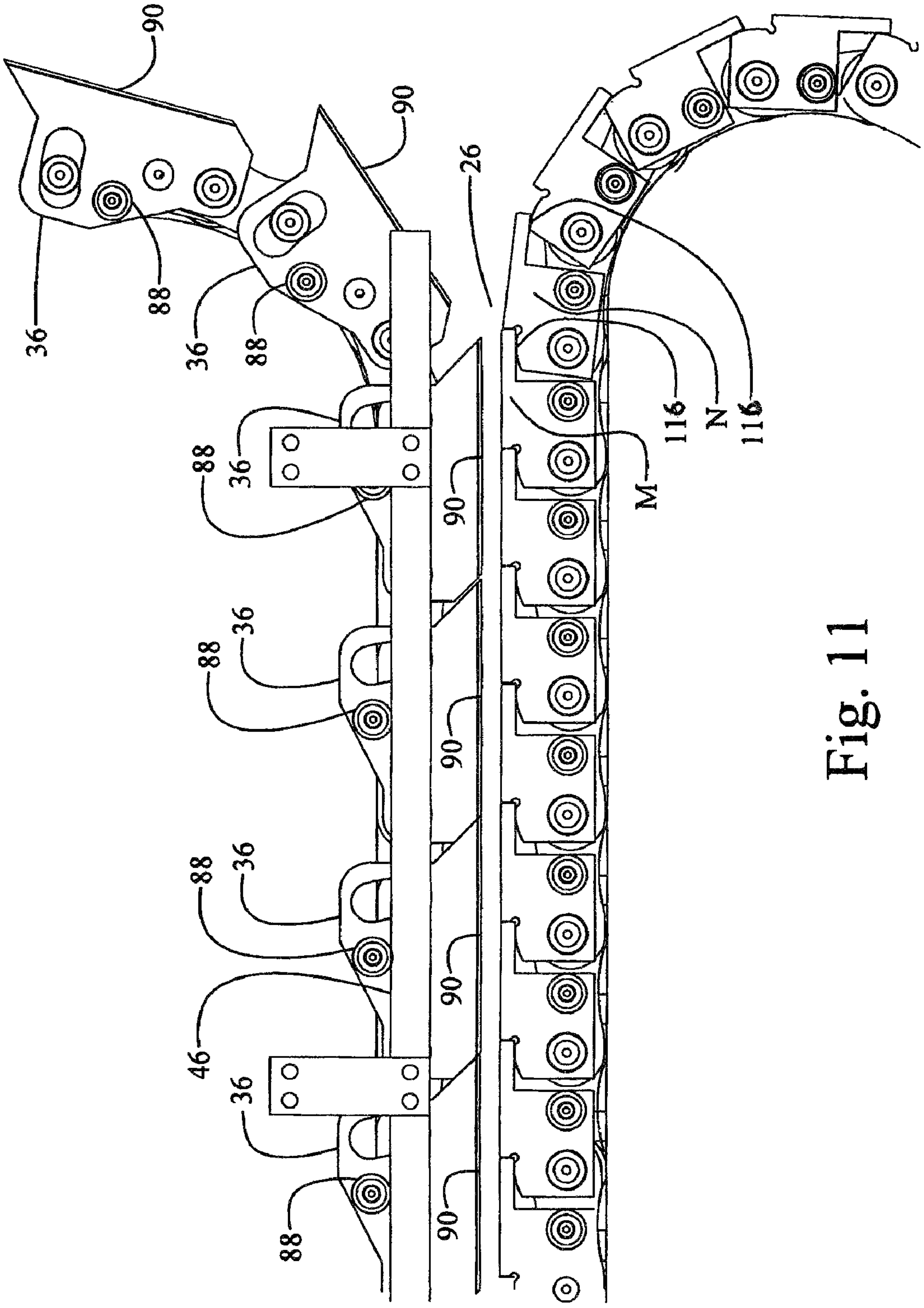
FIG. 11 is a partial elevation view of a length of wallboard passing through an upper and lower press assembly according to an embodiment of the present invention.

The lower shoes assemblies 54, as they pass around the second end 60 of the lower press assembly 24, as viewed in FIGS. 4 and 12, are brought into parallel relationship with the wallboard 26 and contact wallboard 26 prior to the upper shoe assemblies 36 contacting the wallboard 26. In this manner, the lower shoe assemblies 54 provide support for the wallboard 26 and an opposing force for the upper shoe assembly 36 when it makes initial contact with the wallboard 26 and begins compressing the wallboard 26. Additionally, in order to prevent a preceding lower shoe assembly 54, labeled M in FIG. 11, from being forced into the wallboard 26 by the support surface 116 (if the support surface were not arcuate) of a trailing lower shoe assembly 54, labeled N in FIG. 11, the support surface 116 is made arcuate such that the center of the arc formed by the support surface 116 is the center of the bore 108 (FIG. 8C).

Referring to FIG. 12, as the wallboard 26 traverses from right to left, the upper shoe assemblies 36 are moved from an initial impression of 0.010" near a point X to a final impression of 0.102" near a point Y with the horizontal length between points X and Y preferably being about 67". These are preferred dimensions and recesses of greater or lesser depth may be formed. Typically, the final impression is somewhat greater than the desired depth to accommodate some springback in the wallboard. The impression in the wallboard surface is accomplished by a taper along the bottom of plates 30 and 32 which force the upper shoe assemblies 36 into the wallboard by virtue of contact with the bearings 78 and 84. Specifically, the gap between the upper shoe assemblies and the lower show assemblies narrows as the wallboard passed between the upper and lower press assemblies. The taper occurs over a distance of at least 6 inches, but is preferably over a distance of two or more feet, especially at least the width of the wallboard. After point Y, the taper in plates 30 and 32 discontinues so as to prevent further impression into the wallboard or may even reverse such that the upper shoe assemblies 36 back away from contact with the wallboard 26. A takeout conveyor 28 removes the wallboard 26 from the press 20. Alternatively, the taper may end at point Y or even continue beyond that point, relying instead on the fact that the conveyor 28 is positioned lower than the lower press assembly so that the wallboard falls away from the upper press assembly as it advances.

As further shown in FIG. 12, a first length of wallboard 26 is in the taper section, undergoing recess formation. A second length of wallboard 26' is shown leaving the tapper section, already having dropped onto the conveyor, away from the upper press assembly.

Figure 13:
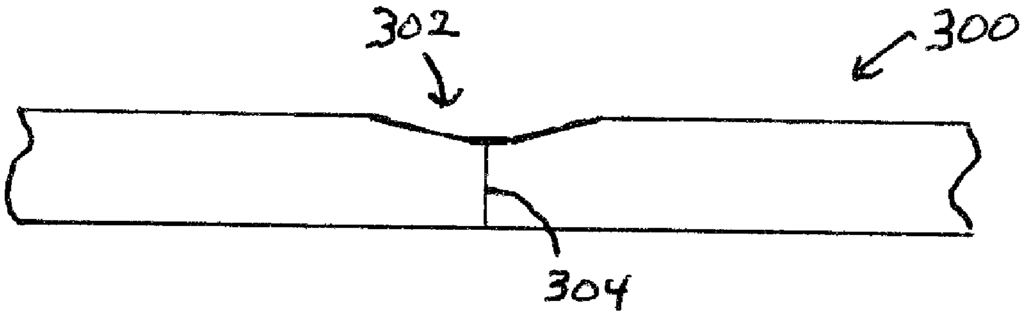
FIG. 13 is a partial, elevation view of an offset recess formed in a length of wallboard.

FIG. 13 shows an elevation view of a portion of a wallboard section 300 have an offset recess formed therein. In this particular embodiment, the recess 302 is a tapered recess. Following completion of the recess formation, the wallboard will be cut along the recess, generally along line 304, such that each edge of the wallboard resulting from the cut will have the tapered edge.

It is contemplated and preferred that each press be easily removable from the support structure so as to facilitate repair and maintenance. In those systems in which a plurality of presses are present, especially those in which one or more presses are individually moveable and capable of being positioned for use, this will allow the manufacturer to continue to produce wallboard with little interruption in production.

In yet another embodiment, the present invention pertains to an improved method and system for continuously forming wallboard panels of defined length wherein each panel has recesses edges along all four edges wherein the improvement comprises the integration of the recess forming apparatus, as described above, into a conventional wallboard forming process and system. Specifically, there is provided a wallboard forming system and method wherein the recess forming apparatus as described above, is inserted into the system at a point removed from that where unfinished lengths of wallboard are formed, most notable, following cutting and flipping of the unfinished length of wallboard, and prior to the final cutting of said wallboard, most preferably, prior to the full curing of the gypsum in the ovens.

In this system and method, the recess forming apparatus is most preferably inserted at the point following the flipping of the unfinished wallboard such that the longitudinal recess faces upwards, towards the ceiling. The flipping is typically performed in a direction perpendicular to the direction of the wallboard as it is being drawn away by the conveyor from the initial cutter that separates the unfinished wallboard length from the continuous feed. The perpendicular motion is continued with the wallboard advancing, one longitudinal edge first, into the recess forming apparatus. After the formation of the recesses in the recess forming apparatus, the wallboard is either cut and cured or cured and then cut, most typically the latter.

This system and method allows one to make multiple lengths of wallboard simultaneously as well as to change the length of wallboard being made with no or minimal interruption in production. Specifically, with the recess forming apparatus having dedicated presses, one merely makes the adjustment advancing those presses needed into the active, wallboard engaging position while retracting those presses no longer needed between successive sheets of unfinished wallboard. Similarly, with those systems wherein the presses are moveable, one merely temporarily stops or slows down the feed line to the recess forming apparatus so as to allow the adjustments to be made in the positioning of the presses before resuming normal speed. All the while, no adjustment in the main production line of the unfinished wallboard sections is needed. Specifically, any back up, if any, can be dealt with in the conveyor means used to move the wallboard in the perpendicular direction following flipping.

Additionally, it is to be appreciated that this system and process enables the continuous manufacture of multiple wallboard panels having recesses on all four edges without stopping the system. This contrasts with prior art systems that must cut the wallboard into the finished lengths prior to forming the recessed lateral edges, a process which involves stoppages, as well as the adjustment of the cutting rate and conveyor rate to accommodate each different length to be formed. In the prior art system, only one length of finished wallboard having recessed lateral edges is capable of being formed at a time. Reconfiguration and/or readjustment of the process and system is needed each time in order to change the wallboard length to be produced.

Although the preferred embodiment of the recess forming apparatus according to the present invention comprises a plurality of presses 20 for use in forming one or more recesses in partially cured wallboard, it is to be appreciated that a recess forming apparatus having a single press, or perhaps two presses, for use in forming one or more recesses in a fully cured wallboard is also within the scope of the present invention. Such an apparatus, owing to its simplicity and portability, is especially suited for use "in the field" at the location of installation of the wallboard and allows the wallboard installer to form recesses in custom cut wallboard lengths or sections prior to installation.

In a further preferred aspect of the invention, the lateral edges of finished lengths of wallboard are wrapped with paper to further strengthen the edge of the wallboard.

While the specific embodiments have been illustrated and described, numerous modifications come to mind without significantly departing from the spirit of the invention, and the scope of protection is only limited by the scope of the accompanying claims.

I claim:

1. A method of making wallboard comprising, in sequence:

a) forming a continuous length of wallboard having first and second surfaces, longitudinal edges running the length of the continuous length of wallboard, and a recess in the first surface along each longitudinal edge;

b) cutting an unfinished length of partially cured wallboard from the continuous length of wallboard;

c) forming a plurality of lateral recesses in the first surface of the wallboard, one lateral recess at each lateral edge of the unfinished length and at least one lateral recess parallel to and offset from the lateral edges; and d) cutting the unfinished length of wallboard at the at least one offset lateral recess to form a plurality of finished lengths of wallboard such that each finished length of wallboard has recessed edges along all four edges of the first surface;

wherein said process further comprises the step of selecting presses for forming the lateral recesses i) from a plurality of prepositioned presses on a recess forming apparatus, the selected presses corresponding to the position of the lateral edges and the desired location of the at least one offset lateral recess or ii) from a plurality of presses on a recess forming apparatus, at least one of said presses being movable from one position to another on the recess forming apparatus, wherein the presses are positioned at points corresponding to the lateral edges of the wallboard to be acted upon as well as at the location of the offset lateral recess(es), prior to forming the plurality of lateral recesses in step (c).

2. The method of claim 1 wherein the presses are selected from a plurality of prepositioned presses on a recess forming apparatus, the selected presses corresponding to the position of the lateral edges and the desired location of the at least one offset recess.

3. The method of claim 1 wherein the presses are selected from a plurality of presses on a recess forming apparatus, at least one of said presses being movable from one position to another on the recess forming apparatus, wherein the presses are positioned at points corresponding to the lateral edges of the wallboard to be acted upon as well as at the location of the offset lateral recess (es).

4. The method of claim 1 wherein the recesses are formed at the same time.

5. The method of claim 1 wherein the recesses are formed by a gradual compression of the first surface of the wallboard at the desired location of the recesses.

6. A method of making wallboard comprising, in sequence:

a) forming a continuous length of wallboard having first and second surfaces, longitudinal edges running the length of the continuous length of wallboard, and a recess in the first surface along each longitudinal edge;

b) cutting an unfinished length of partially cured wallboard from the continuous length of wallboard; and c) forming a plurality of lateral recesses in the first surface of the wallboard by conveying the unfinished length of wallboard through a recess forming apparatus having a plurality of presses aligned with or parallel to the lateral edges of the wallboard, each press having an upper and a lower press assembly, a fore and an aft end, and opposing surfaces on said upper and lower assemblies defining a gap through which the wallboard passes in a planar orientation and in a direction perpendicular to the longitudinal edges and which gap gradually tapers from the fore end of each press, which first receives the wallboard, towards the aft end of each press: the taper causing a gradual compression in the first surface of the wallboard.

7. The method of claim 6 wherein the number of recesses to be formed is two, one at each lateral edge of the wallboard.

8. The method of claim 6, wherein the number of recesses to be formed is at least three, one at each lateral edge of the wallboard to be acted upon and at least one at a location offset from and parallel to the lateral edges and wherein the method further comprises the step of cutting the unfinished length of wallboard at the at least one offset recess to form a plurality of finished lengths of wallboard such that each finished length of wallboard has recessed edges along all four edges of the first surface.

9. The method of claim 6 wherein the recess forming apparatus has at least three stationary presses, each positioned on the apparatus to correspond to various lengths of wallboard, whose upper assembly is moveable from a first position removed from the wallboard and a second position in contact with the wallboard, and wherein the method further comprises the step of selecting and moving to the second position those upper assemblies necessary to produce the recesses in the desired locations.

10. The method of claim 6 wherein the recess forming apparatus has at least three positionable presses, each capable of being positioned on the apparatus to correspond to various lengths of wallboard desired, whose upper assembly is moveable from a first position removed from the wallboard and a second position in contact with the wallboard, and wherein the method further comprises the step of positioning the presses, or that number of presses needed, to the location corresponding to the location of the desired recesses in the wallboard and moving the upper assembly of those presses to the second position.

11. A method of making wallboard comprising, in sequence:

a) forming a continuous length of wallboard having first and second surfaces, longitudinal edges running the length of the continuous length of wallboard, and a recess in the first surface along each longitudinal edge;

b) cutting an unfinished length of partially cured wallboard the continuous length wallboard;

c) forming a plurality of lateral recesses in the first surface of the wallboard, one lateral recess at each lateral edge of the unfinished length and at least one lateral recess parallel to and offset from the lateral edges; and d) cutting the unfinished length of wallboard at the at least one offset lateral recess to form a plurality of finished lengths of wallboard such that each finished length of wallboard has recessed edges along all four edges of the first surface;

wherein the method employs a device comprising a plurality of presses in spaced, parallel relationship, each press having a fore end and an aft end and comprising upper and a lower press assemblies having opposing surfaces defining a gap through which a length of wallboard is to pass, said gap gradually tapering from the fore end towards the aft end of the press assemblies.

12. The method of claim 11 comprising at least three press assemblies.

13. The method of claim 11 wherein the spacing of the presses is fixed.

14. The method of claim 11 wherein at least one press is capable of being moved from one position to another such that the lateral recess to be formed by said at least one press may be formed at, and perpendicular to, any desired location along the longitudinal edge of the wallboard.

15. The method of claim 11 wherein all of the presses are capable of being moved from one position to another relative to the longitudinal edge of the wallboard.

16. The method of claim 11 comprising a plurality of lower press assemblies in excess of the number of upper press assemblies.

17. The method of claim 16 wherein a number of the lower press assemblies are prepositioned to coincide with desired wallboard lengths such that one only needs to move the upper press assembly when wanting to change the wallboard lengths to be produced.

18. The method of claim 11 wherein at least one assembly of each press is moveable from a first position where it is removed from the point where it will engage an unfinished length of wallboard in the gap to a second position where it is capable of forming a recess of the desired depth in a length of wallboard passing through the gap.

19. The method of claim 18 wherein the upper assembly is moveable from said first position to said second position and defines the taper of the gap.

20. The method of claim 11 wherein the opposing surfaces of the press assemblies form continuous loops which rotate about their respective press assemblies, the loop of the upper assembly rotating opposite the rotation of the loop of the lower assembly such that the rotation of both loops helps feed the unfinished length of wallboard through the gap.

21. The method of claim 20 wherein the opposing surfaces of the press assemblies comprise a plurality of linked shoe assemblies forming a continuous loop about each press assembly.

22. The method of claim 20 wherein each press assembly has associated therewith a means for rotating the opposing surfaces about each assembly.

23. The method of claim 22 wherein the means are power driven sprockets.

24. The method of claim 11 wherein the length of the gap is at least six inches.

25. The method of claim 11 wherein the length of the gap is the width of the wallboard.

26. The method of claim 11 further comprising means for detecting changes in the thickness of the wallboard to be processed and for automatically adjusting the position of the upper press assembly engaged in forming the recess relative to the lower press assembly to ensure a consistent recess depth.

27. An improved method for forming wallboard wherein the improvement comprises the formation of lateral recesses in the wallboard which lateral recesses are formed by a lateral recess forming apparatus comprising a plurality of presses in spaced, parallel relationship, each press having a fore end and an aft end and comprising upper and a lower press assemblies having opposing surfaces defining a gap through which a length of wallboard is to pass, said gap gradually tapering from the fore end towards the aft end of the press assemblies, which is integrated into a wallboard forming system.

28. The improved method of claim 27 wherein the lateral recess forming apparatus is inserted into the wallboard forming system at a point after the cutter for the unfinished length of wallboard and after the gypsum in the wallboard has partially cured and before the oven for fully curing the wallboard.

29. The improved method of claim 28 wherein the lateral recess forming apparatus is inserted after the point at which the unfinished wallboard is flipped.

30. The improved method of claim 27 wherein the lateral recess forming apparatus is inserted after the point at which the unfinished length of wallboard is flipped and before the unfinished length of wallboard is cut to its final length.

* * * * *